United States Patent

Nachenberg et al.

Patent Number: 6,167,407
Date of Patent: Dec. 26, 2000

[54] BACKTRACKED INCREMENTAL UPDATING

[75] Inventors: Carey S. Nachenberg, Northridge; William E. Sobel, Cypress, both of Calif.

[73] Assignee: Symantec Corporation, Cupertino, Calif.

[21] Appl. No.: 09/089,930

[22] Filed: Jun. 3, 1998

[51] Int. Cl.[7] .................................................. G06F 17/00
[52] U.S. Cl. ........................ 707/203; 707/102; 707/101; 707/205
[58] Field of Search ........................... 707/1–206; 710/8; 345/349; 360/98.01

[56] References Cited

U.S. PATENT DOCUMENTS

| 5,757,582 | 5/1998 | White et al. | 360/98.01 |
| 5,924,096 | 7/1999 | Draper et al. | 707/10 |
| 5,999,179 | 12/1999 | Kekic et al. | 345/349 |
| 6,009,480 | 12/1999 | Pleso | 710/8 |

FOREIGN PATENT DOCUMENTS 0717 353 A2  6/1996  European Pat. Off. .......... G06F 9/44

OTHER PUBLICATIONS

"User–Friendly Interface for Applying Specific Levels of Coordinated Updates to Software in the Field", IBM Technical Disclosure Bulletin, vol. 31, No. 10, Mar. 1989, Armonk, NY, U.S.A.

Primary Examiner—Thomas G. Black
Assistant Examiner—David Jung
Attorney, Agent, or Firm—Fenwick & West LLP

[57] ABSTRACT

A computer readable file of an original state is updated to a final state. The original state and the final state are both states within a sequence (100) of states, which sequence (100) includes at least one hub state and one non-hub state. A first hub version, which corresponds to a hub state which is at least as early in the sequence as the original state, is stored locally. A hub incremental update (110) is retrieved (314) and used to update (316) the hub version to a second hub version, which second hub version corresponds to a hub state which is at least as early in the sequence (100) as the final state. A final incremental update (112) is retrieved (320) and used with the file of the final hub version to produce (322) a file of the final state. The files corresponding to both the second hub state and the final state are retained (324).

23 Claims, 2 Drawing Sheets

BACKTRACKED INCREMENTAL UPDATING

REFERENCE TO RELATED APPLICATION

This application is related to co-pending, commonly assigned, U.S. patent application Ser. No. 09/047,949 for "Multi-Tiered Incremental Software Updating", filed on Mar. 25, 1998.

FIELD OF INVENTION

This invention pertains to the field of software updating. More specifically, this invention pertains to a system and method for using an archival version of a file to facilitate updating.

BACKGROUND OF THE INVENTION

Some computer software publishers update their software applications (computer programs and data files associated with the programs) frequently. These updates often add new features to the applications as well as remove existing bugs. Several methods are commonly used to update software applications. The simplest of these is to distribute one entire software application to replace an older one. This full update method is simple, but expensive and inconvenient. Typically the software is distributed on some type of removable media, such as floppy disks or CD-ROM's, which are costly to produce and distribute. The time an end user must wait for the removable medium to arrive and the time it takes for the software application to install itself on a computer system are inconvenient. This inconvenience is compounded where updates occur frequently.

Because of the large size of many software applications it is generally not feasible to distribute full updates over computer networks, such as the Internet. When full updates of larger applications are distributed over a network, they often cause such high loads on servers that other users suffer slow-downs on the network, and the servers have trouble meeting the demands.

In order to bypass many of the problems associated with this type of software updating, some software publishers distribute incremental updates. These incremental updates do not contain entire software applications, but rather they contain that information which is necessary to transform a particular version of a software application to a newer version. As used herein, the word "version" indicates a file or application of a specified state. Among the methods available to perform such incremental software updating is binary patching, performed by programs such as RTPatch, published by Pocket Soft, Inc. A binary patcher changes those binary bits of a computer readable file which are different in a newer version. A binary patcher needs, in addition to the old file, a data file which includes the differences between the two versions. Because most software updates involve changes to only a small portion of a software application, incremental update files are generally small. The smaller data files distributed for a binary patch incremental update are often less than 1% of the size of a full update, taking advantage of the large amount of redundancy in the two versions.

The use of incremental update methods allows for smaller updates which can be distributed by means which are not conducive to the distribution of full updates, such as distribution over the Internet. The smaller incremental updates also make distribution by floppy disk more feasible where a full update would have required many disks, and an incremental update may require only one.

However, incremental update methods introduce another problem: an incremental update is specifically useful for updating only one particular version of a software application to another particular version. When updates occur frequently, as with virus protection software applications, end users may update from an arbitrarily old version to the newest version, skipping over several previously released versions. An incremental update for the newest version of a software application will generally update only from the most recent version, however. To update from an arbitrarily old version to the most recent version with incremental updates, a user often needs to acquire and apply a number of successive incremental updates.

One solution to this problem has been for software publishers to group a number of incremental update files together into one distribution. Each necessary incremental update is applied, one at a time, to update to the newest version. However, the number of incremental updates may be large, due to the fact that a grouping generally covers a large number of possible versions. The benefits of smaller distributed update files begin to disappear, as the size of the grouped-together incremental updates grows. Lowering the number of update files available increases the amount of data the average user must acquire for an update, since the user will not need all of the incremental updates in a grouping. This method of updating applications can also be cumbersome, as a series of incremental updates needs to be selected from the group and applied to the software application one after another.

Another solution to the problem of incremental update version-specificity has been to create many unique incremental update files which each transform a different previous version to the most current version. Then, only one incremental update is needed by any user. However, where updates are very frequent, this scheme results in a large number of incremental update files to produce, store and maintain for users. In the case of publishers, such as virus-protection software publishers, who might update their applications as often as daily, this can quickly become untenable. The number of files which must be made available with this scheme grows quickly, and makes the mirroring of incremental updates on a local server almost impossible. For example, in a case where a virus protection software publisher makes new virus definition files available daily, each year's worth of updates will require approximately 365 incremental update files.

One alternative to the methods described above is the use of "push" technology, in which a server maintains a database of what version each user has. The server then sends the necessary updates to each user, as they become available. This system requires "smart" servers, however, to monitor user configurations, to determine what each user needs, and to send the appropriate update information. This results in a server-intensive system which can cause a drain on server resources comparable to that experienced in the full update scheme, when many users are simultaneously requesting full updates. It is preferable to use a system which allows update files to be stored on a "dumb" server which simply provides specifically requested files.

What is needed is a system for updating software applications from an arbitrary first version to a newer version without requiring a large amount of information to be stored and maintained by an update server, without requiring a user to acquire a large amount of data to perform each update, and without requiring the use of "smart" servers.

SUMMARY OF THE INVENTION

The present invention makes use of a "hub" version of a file to facilitate updating. The hub version is stored local to the version being updated. In one embodiment of the present invention, at least one of a sequence (100) of versions of a computer readable file is designated a hub version. Hub incremental updates (110) are made available on a server (200) for updating previously published hub versions to the most recently published hub version. A final incremental update (112) is also made available on the server (200), for updating the most recently published hub version to the current version. A previously published hub version can be used with the two incremental updates (110, 112) to produce a file of the current version. The first incremental update (110) is used (316) to produce the most recent hub version, and the second incremental update (112) is used (322) to produce the current version.

When such an update is carried out, an intermediate version of the file, the most recent hub version, is produced (316). The file of the most recent hub version is retained (324) locally subsequent to the current version being constructed (322). The current version is used as an active version (208), while the most recent hub version is an archive version (206). The next time an update is carried out, the archive (206) version is used with just the two new incremental update files (110, 112) to update to the new current version. If there are few hubs, the number of incremental update patches which must be made available is small. For example, if a virus protection software publisher makes new virus definition files available daily, the publisher may designate as hubs those versions which coincide with the first of each month. Over a year's worth of incremental updates can be stored on the publisher's server (200) in the form of thirteen hub incremental updates (110) and one final incremental update (112). Unlike the case in which large numbers of incremental updates are grouped together to lower the number of files to be maintained, each of the hub incremental updates (110) and the final incremental update (112) can be as small as any other incremental updates.

In another embodiment of the present invention, information about the differences between the active version (208) and the archive version (206) are stored locally instead of the full archive version (206). Before an update takes place, this information is used with the active version (208) of the file to construct the archive version (206). This constructed archive version (206) is then used as above to accomplish the update.

In yet another embodiment of the present invention, the only hub version in the sequence of versions is the initial version. This initial version is maintained locally at all times for update purposes. When an update to a new version of the file is to be performed, only a final incremental update (112) which constructs the current version from the initial version is required. In this way a publisher can make an update generally available to users of many different versions by publishing a single final incremental update (112). Each user, although possibly using an active version (208) which is newer than the initial version, has a local copy of the initial version (206) available.

DETAILED DESCRIPTION OF THE PREFERRED EMBODIMENTS

Figure 1:
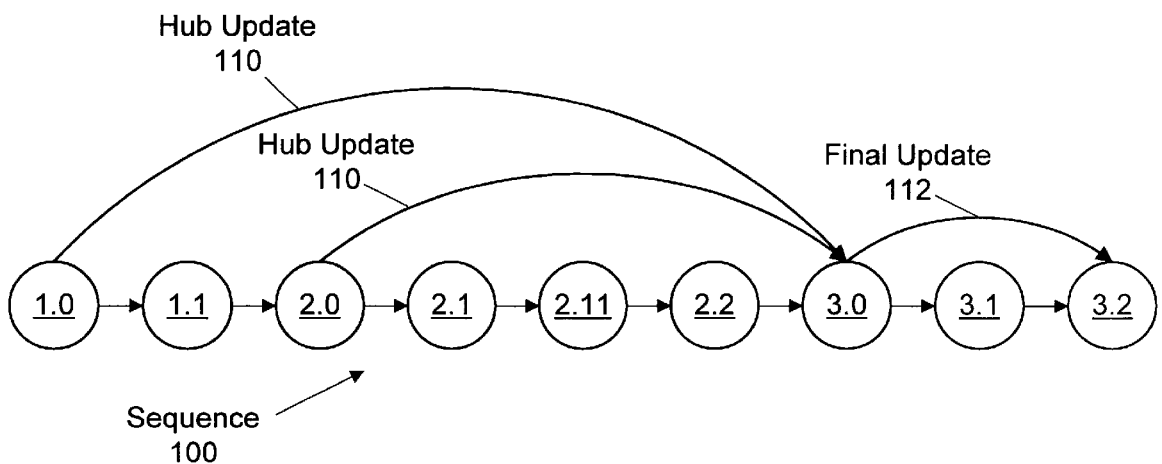
FIG. 1 is an illustration of a sequence 100 of file versions and the incremental updates 110, 112 for transforming them.

Referring now to FIG. 1, a sequence 100 of states 1.0–3.2 of a computer readable file is shown. Each numbered state corresponds to a later state of the file than states with lower numerical designations. Those versions with numerical designations ending in "0.0" correspond to hub versions. In one embodiment, hub versions are major versions and non-hub versions are minor versions. The designation of hub versions does not need to be based on any such distinction, however. In the illustrative embodiment, the computer readable file is a virus definition file used by a virus detection program. As used herein, the term computer readable file encompasses one or more associated files. A computer readable file can be an executable file, a graphics file, an audio file, a data file, a complete software application comprising files of different types, or any other type of computer readable file which can be accessed and updated by a computer.

In FIG. 1, two hub incremental updates 110 are each used to construct a hub version from an earlier hub version. One hub incremental update 110 connects state 1.0 to state 3.0, and the other connects state 2.0 to state 3.0. The hub incremental update 110 shown connecting states 1.0 and 3.0 is an incremental update file which is used to construct a version 3.0 file from a version 1.0 file. Final incremental update 112 is an incremental update file which can be used to construct the most recent version (in this case 3.2) from the most recent hub version (in this case 3.0).

Figure 2:
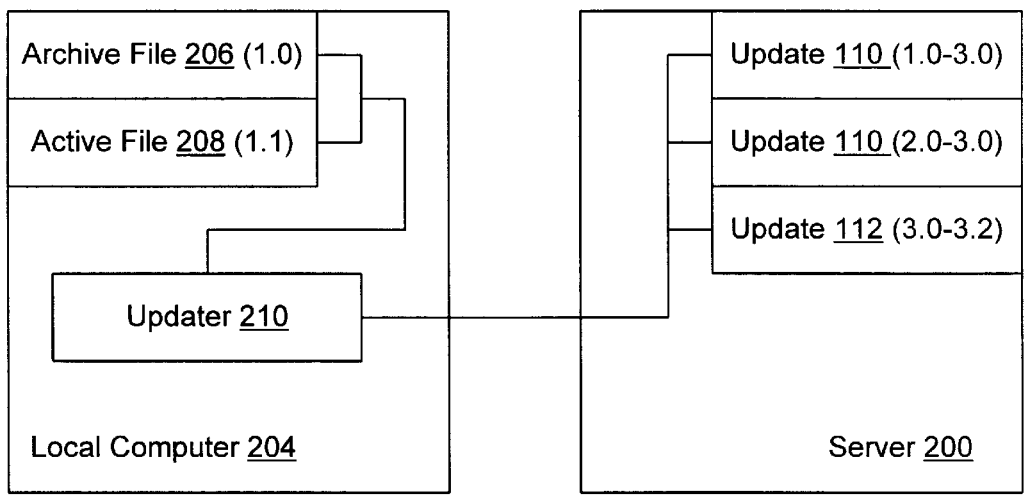
FIG. 2 is an illustration of one embodiment of the present invention.

Referring now to FIG. 2, local computer 204 includes two versions of the computer readable file. Active file 208 is the most recent version available on computer 204, and is used by a virus scanner program. Archive file 206 corresponds to a hub state 1.0 preceding, in sequence 100, the state 1.1 corresponding to active file 208. In an exemplary embodiment of the present invention, archive file 206 is the latest hub version which is not later in sequence 100 than active file 208. When active file 208 is a hub version, redundancy is avoided by storing only one version of the file on computer 204, since both archive file 206 and active file 208 are the same file in that case. Archive file 206, being an older version, is generally not used on computer 204, except in conjunction with updating.

Updater 210, a program local to computer 204, is used to update active file 208 and archive file 206. Provided with an incremental update, updater 210 can create an updated version from an older version. Incremental update files 110 and 112, and updater 210, can be implemented using a conventional incremental update system, such as binary patching.

In other embodiments of the present invention, archive file 206 is stored on computer 204 in a compressed form. This compressed form can be any conventional form of file compression. In one embodiment, archive file 206 is stored on computer 204 in the form of a file indicating the binary differences between uncompressed archive file 206 and active file 208. If archive file 206 is stored in compressed form, it is uncompressed prior to being used for updating.

A software publisher makes several hub incremental updates 110 and one final incremental update 112 available on server 200. Server 200 transmits an incremental update file to local computer 204 in response to a request for the file. Server 200 can be a file server on a local area network (LAN), a file server on a wide area network (WAN), an FTP (File Transfer Protocol) server, an HTTP (Hypertext Transfer Protocol) server, or an NNTP (Network News Transfer Protocol) server. Additionally, server 200 can be a removable magnetic or optical storage medium, or any other type of storage device capable of supplying computer readable files to local computer 204 in response to a request for such files. The minimal requirements for server 200 enable conventional, inexpensive dumb servers to be used.

Figure 3:
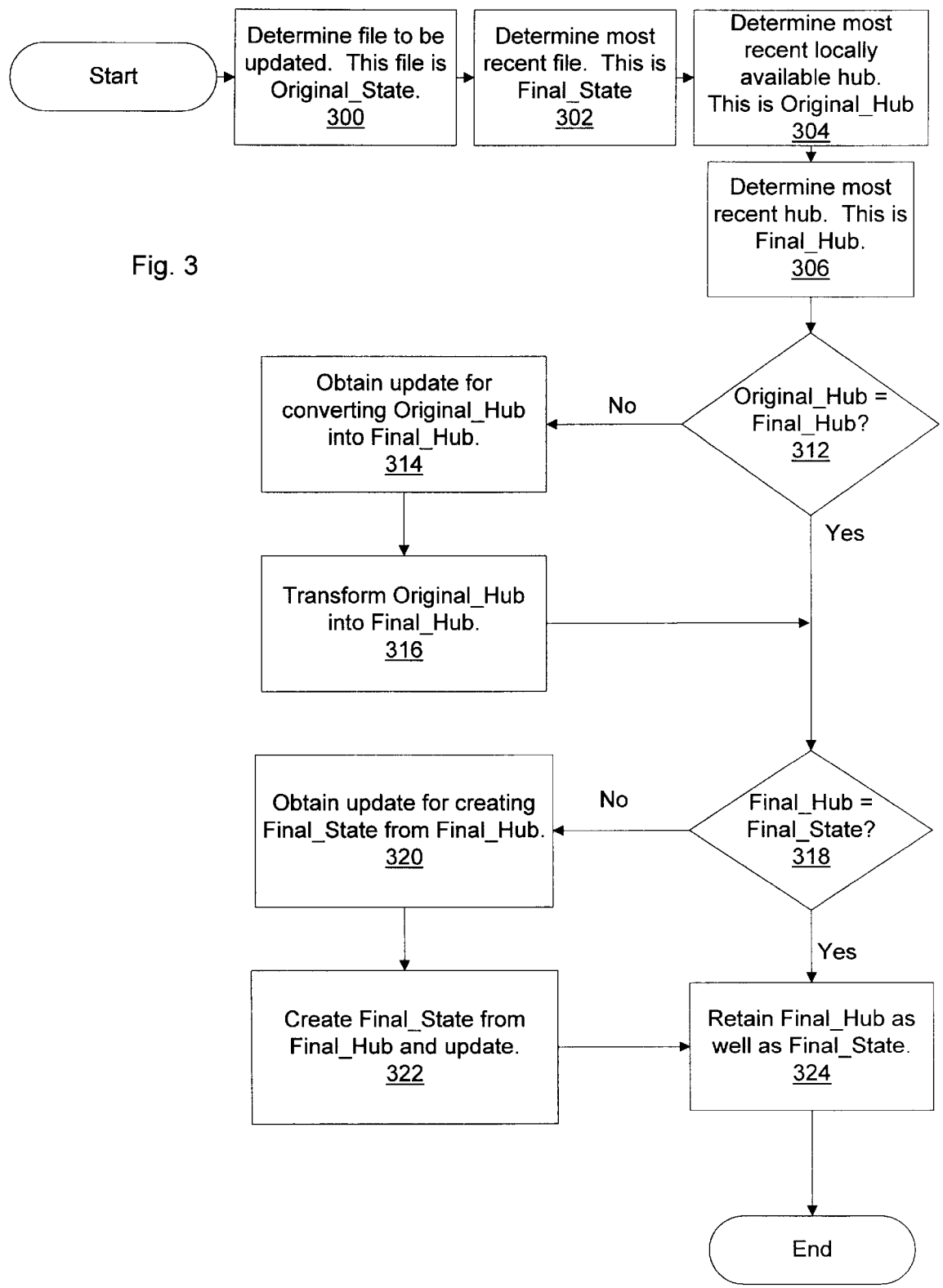
FIG. 3 is a flowchart illustrating the operation of one embodiment of the present invention.

The operation of an exemplary embodiment is described with reference to FIG. 3. First, active file 208 to be updated is selected 300 as the Original_State. Then, the most recent version available on server 200 is identified 302 by updater 210 as the Final_State. The most recent locally available hub version is designated 304 the Original_Hub. This is ordinarily archive file 206. Where active file 208 is a hub version, however, Original_Hub will be Original_State. Next, the most recent hub version available on server 200 is identified 306 by updater 210 as the Final_Hub. Ordinarily, the Final_Hub state will precede the Final_State in the sequence of states. Where Final_State is a hub state, however, they will be the same.

A test is performed 312 by updater 210 to determine whether Original_Hub and Final_Hub correspond to the same state. If they do, no hub updating is necessary. Otherwise, hub updating is necessary, and a hub incremental update 110 is retrieved 314 from server 200. The hub incremental update 110 retrieved is an incremental update for use in transforming a file of Original_Hub state to Final_Hub state. Hub incremental update 110 can be downloaded over a network, or it can be read from a removable medium, such as a magnetic or optical disk. Hub incremental update 110 is used by updater 210 to transform 316 archive file 206 from the Original_Hub state to the Final_Hub state.

After producing a file of Final_Hub state on local computer 204, a test is performed 318 by updater 210 to determine whether Final_Hub is the same state as Final_State. If so, no further updating is necessary to obtain the Final_State version. Otherwise final incremental update 112 is retrieved 320 from server 200. Final incremental update 112 is the incremental update which is used to transform a file from Final_Hub state to Final_State. After being retrieved, final incremental update 112 is used by updater 210 to create 322 Final_State from Final_Hub. The Final_Hub version is retained 324 on local computer 204 after Final_State has been produced. If the updating scheme used by updater 210 is one which replaces the file being updated with a new one, then it is necessary to create a copy of Final_Hub prior to applying final incremental update 112 to it. When the updating is completed, the Final_Hub version is archive file 206, and the Final_State version is active file 208.

For clarity, in the exemplary embodiment described above, the Final_State and the Final_Hub state are explicitly identified by updater (210). In a preferred embodiment, each hub incremental update 110 is packaged with final incremental update 112 on server 200. This package is identified as corresponding to the Original_Hub state to which the included hub incremental update 110 applies. Rather than determining what the Final_Hub and Final_State are, updater 210 requests the package identified as being for Original_Hub state, extracts the included incremental updates, and applies them to Original_Hub. If Original_Hub is the same as Final_Hub, the package does not contain a hub incremental update 110, and if the Final_Hub is the Final_State, no final incremental update 112 is included. In this embodiment, updater 210 does not explicitly determine whether Original_Hub is the same as Final_Hub, or whether Final_Hub is the same as Final_State. For simplicity, only one file needs to be retrieved, and communication between updater 210 and server 200 is minimized. Suitable methods for packaging the files together are known in the art, and include the Java Archive (JAR) platform-independent file format, available from Sun Microsystems.

By increasing the amount of information stored locally, the present invention permits updating from a small number of incremental updates retrieved from a dumb server without requiring that a large number of incremental update files are stored on the server. Such a system lends itself to mirroring, where the incremental update files necessary for an update are stored on servers other than those controlled by the publisher. For example, a company can maintain locally the files necessary to support frequent updating of a particular application. Employees of the company can access the files through a LAN in order to accomplish updating. This would be difficult with conventional systems, because either the company would need to maintain a very large number of files, or the amount of information sent over the LAN to support updates would be large. The trade-off for the lower amount of information sent over the network and the lower amount of information stored on the update server is that a larger amount of information is stored on each user's local computer. This trade-off is generally acceptable, since mass storage costs are low and only one archival version of an application must be stored on each local computer.

The above description is included to illustrate the operation of exemplary embodiments and is not meant to limit the scope of the invention. The scope of the invention is to be limited only by the following claims. From the above description, many variations will be apparent to one skilled in the art that would be encompassed by the spirit and scope of the present invention.

What is claimed is:

1. A method for facilitating updating of a computer readable file to a final state, the final state being a state within an ordered sequence of states associated with the file, the sequence including at least one hub state, the method comprising the steps of:
   determining as a final hub state a hub state which is at least as early in the sequence as the final state;
   for each hub state which is earlier in the sequence than the final hub state, making available a hub incremental update containing information about differences between that hub state and the final hub state; and
   responsive to the final hub state not being the final state, making available a final incremental update containing information about differences between the final hub state and the final state.

2. The method of claim 1, wherein the sequence includes at least one state which is not a hub state.

3. The method of claim 1, wherein the step of making available a final incremental update comprises, for each hub incremental update, making available a package including the hub incremental update and the final incremental update.

4. The method of claim 1, wherein the step of determining the final hub state comprises selecting the latest hub state which is not preceded in the sequence by the final state.

5. The method of claim 1, wherein the sequence of states is a temporal sequence, and each state in the sequence is associated with a position in time.

6. The method of claim 1, wherein the step of making available a hub incremental update comprises putting the hub incremental update on a server computer, and the step of making available a final incremental update comprises putting the final incremental update on the server computer.

7. The method of claim 1, wherein the step of making available a hub incremental update comprises putting the hub incremental update on a removable computer readable storage medium and the step of making available a final incremental update comprises putting the final incremental update on the removable computer readable storage medium.

8. A method for updating a computer readable file of an original state to a final state, the file of the original state residing on a local computer system, the original state and the final state being states within an ordered sequence of states associated with the file, the final state being later in the sequence than the original state, and the sequence including a final hub state which is not preceded in the sequence by the final state, the method comprising the steps of:

accessing from a local storage location a file of an original hub state, the original hub state being a hub state in the sequence which is not preceded in the sequence by the original state;

responsive to the original hub state not being the final hub state:

accessing a hub incremental update containing information about differences between the original hub state and the final hub state;

using the hub incremental update and the file of the original hub state to produce a file of the final hub state; and storing the file of the final hub state; and responsive to the final hub state not being the final state:

accessing a final incremental update containing information about differences between the final hub state and the final state;

using the final incremental update and the file of the final hub state to produce a file of the final state; and storing the file of the final state.

9. The method of claim 8, wherein the sequence includes at least one state which is not a hub state.

10. The method of claim 8, wherein the hub incremental update and the final incremental update are included in a package, and the sub-step of accessing the hub incremental update and the sub-step of accessing the final update are both performed by accessing the package.

11. The method of claim 8, wherein the local storage location is internal to the local computer system.

12. The method of claim 8, wherein the local storage location is a removable computer readable storage medium.

13. The method of claim 8, wherein the sub-step of accessing a hub incremental update comprises accessing the hub incremental update over a computer network, and the sub-step of accessing a final incremental update comprises accessing the final incremental update over the computer network.

14. The method of claim 8, wherein the original hub state is the latest hub state which is not preceded in the sequence by the original state.

15. The method of claim 8, wherein the final hub state is the latest hub state which is not preceded in the sequence by the final state.

16. The method of claim 8, wherein the sub-step of storing the file of the final hub state comprises replacing the file of the original hub state in the local storage location with the file of the final hub state.

17. The method of claim 8, wherein the sequence of states is a temporal sequence, and each state is associated with a position in time.

18. The method of claim 8, wherein the sub-step of storing the file of the final hub state comprises storing the file of the final hub state in a compressed form.

19. The method of claim 8, wherein there is only one hub state in the sequence, the hub state not being preceded in the sequence by the original state.

20. A system for facilitating updating of a computer readable file to a final state, the file residing on a local computer, the final state being a state within an ordered sequence of states associated with the file, the sequence including a final hub state which is a hub state that is not preceded in the sequence by the final state, the system comprising:

for each hub state preceding the final hub state in the sequence, a hub incremental update containing information about differences between that hub state and the final hub state;

a final incremental update containing information about differences between the final hub state and the final state;

a server coupled to the local computer, which server has access to any hub incremental updates and the final incremental update, and which, in response to a request by the local computer for an incremental update, transmits the requested incremental update to the local computer.

21. The system of claim 20, wherein the server is coupled to the local computer by a computer network.

22. The system of claim 21, wherein the server is a removable computer readable storage medium.

23. A computer readable medium containing a computer program for updating a computer readable file of an original state to a final state, the file of the original state residing on a local computer system, the original state and the final state being states within an ordered sequence of states associated with the file, the final state being later in the sequence than the original state, the sequence including as a final hub state a hub state which is not preceded in the sequence by the original state, and the computer program, when executed by the local computer system, causing the local computer system to perform the steps of:

accessing from a local storage location a file of an original hub state, the original hub state being a hub state which is not preceded in the sequence by the original state;

responsive to the original hub state not being the final hub state:

accessing a hub incremental update containing information about differences between the original hub state and the final hub state;

using the hub incremental update and the file of the original hub state to produce a file of the final hub state; and storing the file of the final hub state; and responsive to the final hub state not being the final state:

accessing a final incremental update containing information about differences between the final hub state and the final state;

using the final incremental update and the file of the final hub state to produce a file of the final state; and storing the file of the final state.

\* \* \* \* \*

UNITED STATES PATENT AND TRADEMARK OFFICE
CERTIFICATE OF CORRECTION

PATENT NO. : 6,167,407
DATED : December 26, 2000
INVENTOR(S) : Carey S. Nachenberg and William E. Sobel It is certified that error appears in the above-identified patent and that said Letters Patent is hereby corrected as shown below:

In column 8, line 26, delete "claim 21" and insert in place thereof --claim 20--.

Signed and Sealed this

Tenth Day of July, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 6,167,407
DATED : December 26, 2000
INVENTOR(S) : Carey S. Nachenberg and William E. Sobel It is certified that error appears in the above-identified patent and that said Letters Patent is hereby corrected as shown below:

<u>Column 8,</u>
Line 36, delete "original", and insert in place thereof -- final --.

Signed and Sealed this

Eighth Day of April, 2003

JAMES E. ROGAN
*Director of the United States Patent and Trademark Office*